Patented Nov. 17, 1931

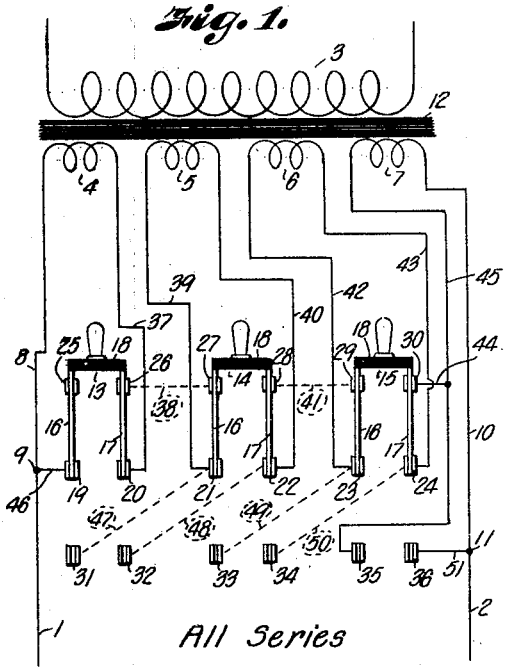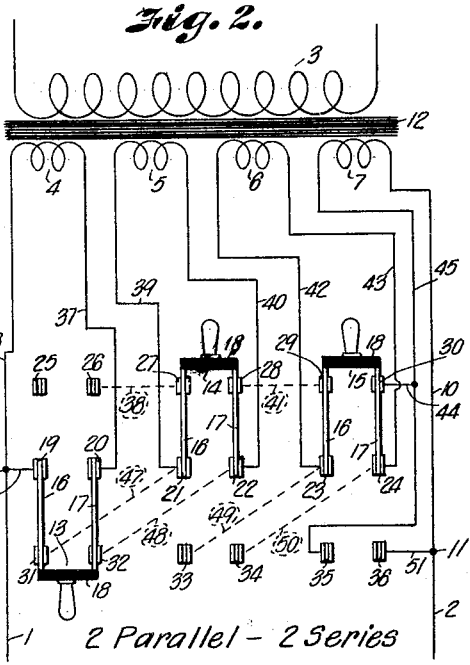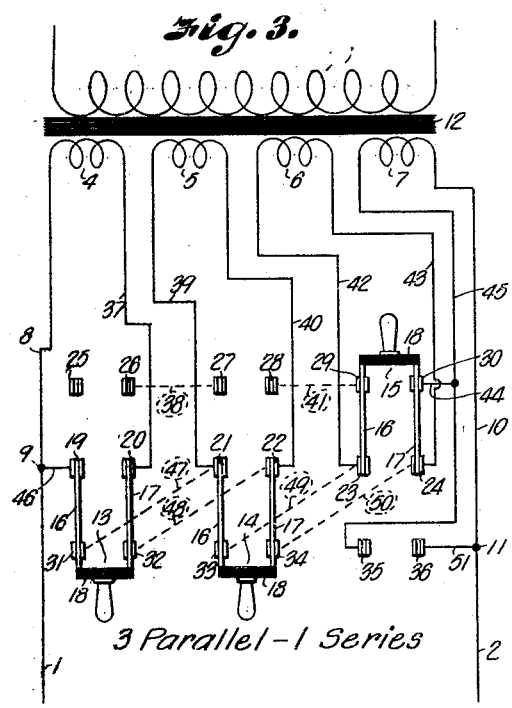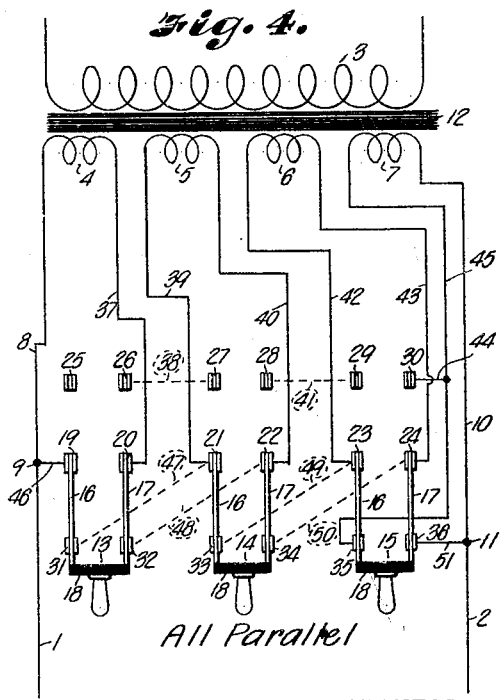

1,831,886

UNITED STATES PATENT OFFICE

JULIAN J. ROSS, OF KANSAS CITY, MISSOURI

TRANSFORMER

Application filed November 11, 1929. Serial No. 406,372.

My invention relates to transformers, and has for its principal object to vary selectively the voltage of a current induced in a secondary circuit by the current of a primary circuit.

Devices of the character described, sometimes include a continuously wound primary coil tapped at intervals whereby more or less of the primary coil may be included in a working circuit to vary the voltage of current induced in the secondary circuit. When the voltage of the secondary is reduced by using one of the taps the excluded portion of the winding not used usually lies between the live winding and the core of the primary member, or between the live winding and the secondary coil, thus forming a dead end or a useless portion of the primary coil. The result of the ordinary structure just described is reduction in the efficiency of the transformer.

Further objects of my invention therefore are to include the entire primary coil member in the working circuit of a transformer at all times, to effect variation in the voltage of an induced current without reducing the efficiency of the primary coil, to maintain the effective relation between a primary coil and a secondary coil under all voltage-changing conditions, whereby the primary current may flow through the entire primary coil at all times regardless of the voltage wanted, and there may be no dead wire portions in the primary winding.

My invention contemplates the provision of a plurality of coils in the primary member of a transformer, and selective arrangement of the coils in the circuit in parallel or series. Further objects of the invention are to connect one or more of a plurality of coils selectively either in series or parallel with other coils, and to connect a pair of parallel coils in series with one or more other coils.

In accomplishing these and other objects of the invention, I have provided improved details of structure, the preferred form of which is illustrated in the accompanying drawings, wherein:

Fig. 1 is a diagrammatic view of a transformer circuit constructed in accordance with my invention, illustrating switches set to connect the primary coils in series.

Fig. 2 is a similar view illustrating the positions of switches set to connect two coils in parallel and two coils in series in the primary circuit.

Fig. 3 is a similar view illustrating three coils connected in parallel and one in series with the three parallel coils.

Fig. 4 is a similar view illustrating all of the coils connected in parallel.

Referring in detail to the drawings:

1 and 2 designate respectively the service lines of a primary circuit whereby a current is to be induced in the coil 3 of a secondary circuit.

I provide a plurality of windings or coils for example four, designated 4, 5, 6 and 7 to comprise the primary coil member, the first coil of the series having a lead 8 connected at 9 to the line 1, and the last coil having a lead or branch 10 connected at 11 to the line 2. Any working circuit therefore will include all of the coils.

The primary and secondary coils may be arranged in any suitable manner to promote induction of a current in the secondary circuit, with relation to a core 12.

A series of switch levers 13, 14 and 15 is provided, having conductive arms 16 and 17 connected by insulating bars 18 and ends pivotally mounted in pairs of terminals designated 19 and 20, 21 and 22, and 23 and 24, for the several switches. One switch is permanently electrically connected to each of the coils except the last coil as presently described.

Two sets of pairs of insulated socket contacts are provided for each switch lever, for effecting desired relations between the coils, the contacts of one set which will be called the first set being designated 25 and 26, 27 and 28, and 29 and 30 for the several switches, and the contacts of the other set being designated 31 and 32, 33 and 34, and 35 and 36.

Conductors connecting contacts with each other and with leads will be described in the course of description of various settings of the switches for obtaining desired voltage values.

When the coils are to be connected in series, all the switches are engaged within the first set of contacts, as illustrated in Fig. 1.

The primary currents, considering the circuit supplied with alternating current, and tracing the flow in one direction, flows through lead 8, coil 4, branch 37 to terminal 20 of the switch 13, then through arm 17, contact 26, and a conductor 38 to contact 27 of the second coil switch assembly. The current flows then through arm 16 of the switch 14, terminal 21, lead 39, coil 5, branch 40, terminal 22, and switch arm 17 to contact 28, thence through conductor 41, contact 29, arm 16 of the switch 15, lead 42, coil 6, lead 43, terminal 24, arm 17, contact 30, conductor 44, to lead 45 and through the coil 7 to branch 10 and the line 2 of the circuit.

When it is desired to connect two coils in parallel and two in series, the switch 13 is thrown to engage the arms thereof with the contacts 31 and 32, the other switches being set as before described.

A branch conductor 46 connecting the service line 1 with the terminal 19 of the first switch assembly is now effective, the primary current flowing through the switch arm 16 of switch 13, contact 31, conductor 47, terminal 21 of the second switch assembly, and through the coil 5, contact 22 and the conductor 41 and terminal 29 of the third switch assembly. Current also flows through lead 8, coil 4, terminal 20, contact 32, line 48, terminal 22, contact 28 and line 41.

The coils 4 and 5 are thus connected in parallel, while the coils 6 and 7 are still in series, and are in series with the pair of parallel coils.

For connecting three coils in parallel and one in series with the parallel coils, the switch 14 is thrown to engage the contacts 33 and 34. The primary current therefore, instead of passing from the coil 5 through the coil 6, flows from contact 33, that is, from the service line 1, through a conductor 49 to terminal 23 of the third switch assembly into the coil 6. Current from the coil 5 flows through the contact 34 and conductor 50 to terminal 24, and through arm 17 of the switch 15 to contact 30, conductor 44 and lead 45 of the last coil.

To connect all coils in parallel, the switch 15 is thrown to engage the contacts 35 and 36. Current from the branch 49 then passes through the arm 16 of switch 15, contact 35, and branch conductor 45 to the last coil, and current from the coil 6 flows through contact 36 and a branch conductor 51 to the line 2.

It is to be understood that the current flows oppositely for the opposite phase of the alternating current.

The switches may thus be manipulated to connect the coils with two or more in parallel, and with one or more in series with the parallel coils. The current thus flows through the entire primary winding and all the windings whenever the primary circuit is closed, and all portions of the secondary coil are influenced at all times by the active primary coil.

Attention is called to the relation of the coils adapted to be connected in parallel with the series coils, and the by-passing conductor for current for coils connected in series, whereby flow of current through parallel coils is assured.

Adjustment of the coils may thus be effected to vary the voltage in the secondary circuit, while maintaining the efficiency of the transformer, no part of any circuit or coil being cut out from useful service during the flow of current through the primary circuit.

Attention is further called to the fact that the primary current, in the illustrated application of the invention, must flow through the arms 17 of the several switches, and when any switch is disengaged from contacts, the primary circuit is broken.

What I claim and desire to secure by Letters Patent is:

1. In apparatus of the character described including a secondary coil and a primary circuit including service lines, a plurality of switches including a switch having one terminal permanently connected to one line, a plurality of coils equal in number to said switches, each having terminals permanently connected to the terminals of the switches, a plurality of switch contact posts, a further coil having one terminal connected to a switch contact post and one terminal connected to the other service line, and means including said switch contacts whereby the switches may be manipulated to connect selected coils in parallel or in series with other coils.

2. In apparatus of the character described including a secondary coil and a primary circuit including service lines, a series of switches including a switch having one terminal permanently connected to one service line, a plurality of primary coils equal in number to said switches, each having terminals permanently connected to the terminals of the switches, a plurality of sets of switch contact posts for each switch, a further primary coil having one terminal connected to one of the switch contact posts of the switch opposite to the first named switch in the series, and one terminal connected to the service line opposite the first named service line, and means including said sets of switch contacts whereby the switches may be manipulated to connect two or more coils selectively in parallel or in series with other coils.

3. In apparatus of the character described including a secondary coil, a plurality of primary coils associated with the secondary coil, service lines for supplying the primary coils and double-pole double-throw switches interconnecting said primary coils with the service lines to selectively connect said primary coils in series and parallel relation.

4. In apparatus of the character described including a secondary coil, a plurality of primary coils associated with the secondary coil, service lines for supplying the primary coils, sets of series contacts, complementary sets of parallel contacts, and a pair of conductive members for each set of series contacts selectively movable from the series contacts to the complementary sets of parallel contacts for connecting the primary coils in selective series and selective parallel relation.

5. In apparatus of the character described including a secondary coil, a plurality of primary coils associated with the secondary coil, service lines for supplying the primary coils, switches interconnecting the service lines with the coils including sets of series contacts, complementary sets of parallel contacts and pairs of interconnected conductive members for each set of series contacts selectively movable from the series contacts to the complementary sets of parallel contacts for connecting the primary coils in series and parallel relation.

6. In apparatus of the character described including a secondary coil, a plurality of primary coils associated with the secondary coil, service lines for supplying the primary coils, and switches interconnecting the coils with the service lines including sets of series contacts, complementary sets of parallel contacts and permanently connected conductive members for each set of series contacts and movable from the series contacts to the complementary sets of parallel contacts for connecting the primary coils in series and parallel relation.

7. In apparatus of the character described including a secondary coil, a plurality of primary coils associated with the secondary coil, service lines for supplying the primary coils, means for connecting the service lines to the primary coils including sets of series contacts, complementary sets of parallel contacts, a pair of terminals positioned between each set of series contacts and a complementary set of parallel contacts, conductive members pivotally carried by the terminals and adapted to selectively engage the series contacts and the parallel contacts to connect the primary coils in series parallel and parallel and series relation.

In testimony whereof I affix my signature.

JULIAN J. ROSS.